US011551264B2

(12) United States Patent
Newell

(10) Patent No.: US 11,551,264 B2
(45) Date of Patent: Jan. 10, 2023

(54) SYSTEMS AND METHODS FOR INTELLIGENT AD-BASED ROUTING

(71) Applicant: DISH NETWORK L.L.C., Englewood, CO (US)

(72) Inventor: Nicholas Brandon Newell, Centennial, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 16/573,529

(22) Filed: Sep. 17, 2019

(65) Prior Publication Data

US 2021/0081994 A1   Mar. 18, 2021

(51) Int. Cl.
*G06Q 30/02* (2012.01)
*G01C 21/36* (2006.01)
*G06N 20/00* (2019.01)

(52) U.S. Cl.
CPC ..... *G06Q 30/0265* (2013.01); *G01C 21/3697* (2013.01); *G06N 20/00* (2019.01); *G06Q 30/0271* (2013.01)

(58) Field of Classification Search
CPC ........... G06Q 30/0635; G06Q 30/0269; G06Q 50/30; G06Q 30/0633; H04W 4/025
USPC ...................................................... 705/25.81
See application file for complete search history.

(56) References Cited

U.S. PATENT DOCUMENTS

| 8,437,776 | B2* | 5/2013 | Busch | H04W 4/025 |
| | | | | 455/456.1 |
| 2011/0040626 | A1* | 2/2011 | Lin | G01C 21/3697 |
| | | | | 705/14.63 |
| 2012/0191537 | A1* | 7/2012 | O'Sullivan | G06Q 30/0269 |
| | | | | 705/14.49 |
| 2012/0264457 | A1* | 10/2012 | Khosravy | H04W 4/026 |
| | | | | 455/456.3 |
| 2012/0310530 | A1* | 12/2012 | Lee | G01C 21/3697 |
| | | | | 701/465 |

(Continued)

*Primary Examiner* — Saba Dagnew
(74) *Attorney, Agent, or Firm* — Perkins Cole LLP

(57) ABSTRACT

Examples of the present disclosure describe systems and methods for intelligent ad-based routing. In example aspects, a destination input, desired time for arrival, and user profile data is received in a ride-sharing application. The input data is classified by applying one or more machine-learning models to the data. Based on the classified data results, candidate physical advertisement locations may be selected along a certain route. Different types of routes may be selected that range from the shortest possible route (i.e., a direct route) to a major detour (i.e., the most cost-effective route). A major detour takes the user on a route that exposes the user to as many advertisements as possible while still arriving at the final destination before the desired time of arrival. In exchange for a longer route and more exposure to physical advertisements, the cost of the ride may be offset. While the user is in proximity to the physical advertisement along the route, businesses associated with the physical advertisement locations may transmit real-time advertisements/messages to the user to be displayed on a user device, a vehicular device, and/or a combination of the two. During the ride, the real-time business information may be received that may alter the route to maximize the effectiveness of real-time advertisement delivery.

20 Claims, 7 Drawing Sheets

(56) References Cited

U.S. PATENT DOCUMENTS

| | | | |
|---|---|---|---|
| 2015/0012384 A1* | 1/2015 | Bank | G06Q 30/0633 |
| | | | 705/26.41 |
| 2015/0356665 A1* | 12/2015 | Colson | G06Q 30/0635 |
| | | | 705/26.81 |
| 2016/0320194 A1* | 11/2016 | Liu | G01C 21/3438 |
| 2017/0255966 A1* | 9/2017 | Khoury | H04L 67/20 |
| 2017/0282942 A1* | 10/2017 | Mathews, Jr. | B61L 3/008 |
| 2018/0137593 A1* | 5/2018 | Djuric | G06Q 50/30 |

* cited by examiner

SYSTEMS AND METHODS FOR INTELLIGENT AD-BASED ROUTING

TECHNICAL FIELD

The present disclosure is related to the field of intelligent route creation based on advertisement exposure. In particular, the present disclosure is directed at a computer system that is capable of receiving destination input data and user profile data and determining a route based on the locations of physical advertisements, such as store fronts, billboards, bus stops, and the like. Along with the destination input, a user may also input a desired time of arrival (DTA). Based on the DTA, the computer systems and methods disclosed herein may create a certain route that exposes the user to certain advertisements. In the context of ride-sharing and taxi-based applications, electing to take a longer route to a destination with more advertisement exposure may decrease the overall cost of the ride. In other words, a user may have the option to receive discounted rides if the user is willing to take a longer route that exposes the user to more ads. Additionally, a user may elect to pay full price for the ride, and the created route will be the quickest route based on current traffic congestion and distance to the destination. Application of intelligent ad-based routing decreases the cost of ride-sharing and taxi-based applications for consumers and shifts a portion of the cost to businesses wanting to advertise to the riders. Further, intelligent ad-based routing efficiently injects relevant advertisements, based on at least one machine-learning classification algorithm, into a communication protocol utilized by a user device, vehicular computer, or other electronic device, among others.

BACKGROUND

With the proliferation of gig-economy ride-sharing and autonomous vehicles, fewer users will elect to manually drive themselves to destinations, opting instead to ride as a passenger in a car operated by a driver for a ride-sharing company and/or in a fully autonomous car. As the term is used herein, "ride-sharing" refers to an arrangement in which a passenger travels in a private vehicle that is operated by the vehicle's owner, typically arranged by means of a website or an application. The operation may be conducted through a human driver, autonomously, or a combination of both.

Over time, aggregated ride-sharing costs may become expensive for users. In order to offset the prices of ride-sharing, the systems and methods disclosed herein may reconfigure the route to the destination so that the rider-user is exposed to certain advertisements along the route. In other words, businesses may offset the cost of ride-sharing by paying ride-sharing companies to re-route their passengers to pass by physical advertisements, such as store fronts, billboards, bus stops, and similar physical advertisements. The rider may elect a cheaper ride in exchange for a longer route that passes by more physical advertisements. Conversely, the rider may elect a full-priced ride in exchange for the quickest, most direct route to the destination, without regard to physical advertisement locations along the route.

After a user inputs the destination and DTA, the systems and methods disclosed herein may execute at least one classification algorithm to determine the characteristics of the destination in relation to profile data of the user. The classification data may be compared against at least one machine learning model to further determine the most relevant advertisements to display to the user. Relevance of advertisements may be based on historical user data (e.g., trip data, purchase history, etc.) and/or real-time business information (e.g., whether the business is currently open or closed, average busyness based on the current time and day, special promotions or sales, etc.), among other data.

As such, the systems and methods disclosed herein enable businesses to leverage the proliferation of ride-sharing to inject intelligent and relevant advertisements into a communication protocol as ride-sharing users pass by physical advertisements in real-time. Rather than inefficiently communicating advertisements without regard to a user's location or preferences, the systems and methods disclosed herein enable the intelligent communication of real-time, relevant advertisements that are cost-effective for both ride-sharing users and businesses.

It is with respect to these and other general considerations that the aspects disclosed herein have been made. Also, although relatively specific problems may be discussed, it should be understood that the examples should not be limited to solving the specific problems identified in the background or elsewhere in the disclosure.

BRIEF DESCRIPTION OF THE DRAWINGS

Non-limiting and non-exhaustive examples are described with reference to the following figures.

DETAILED DESCRIPTION

Figure 1:
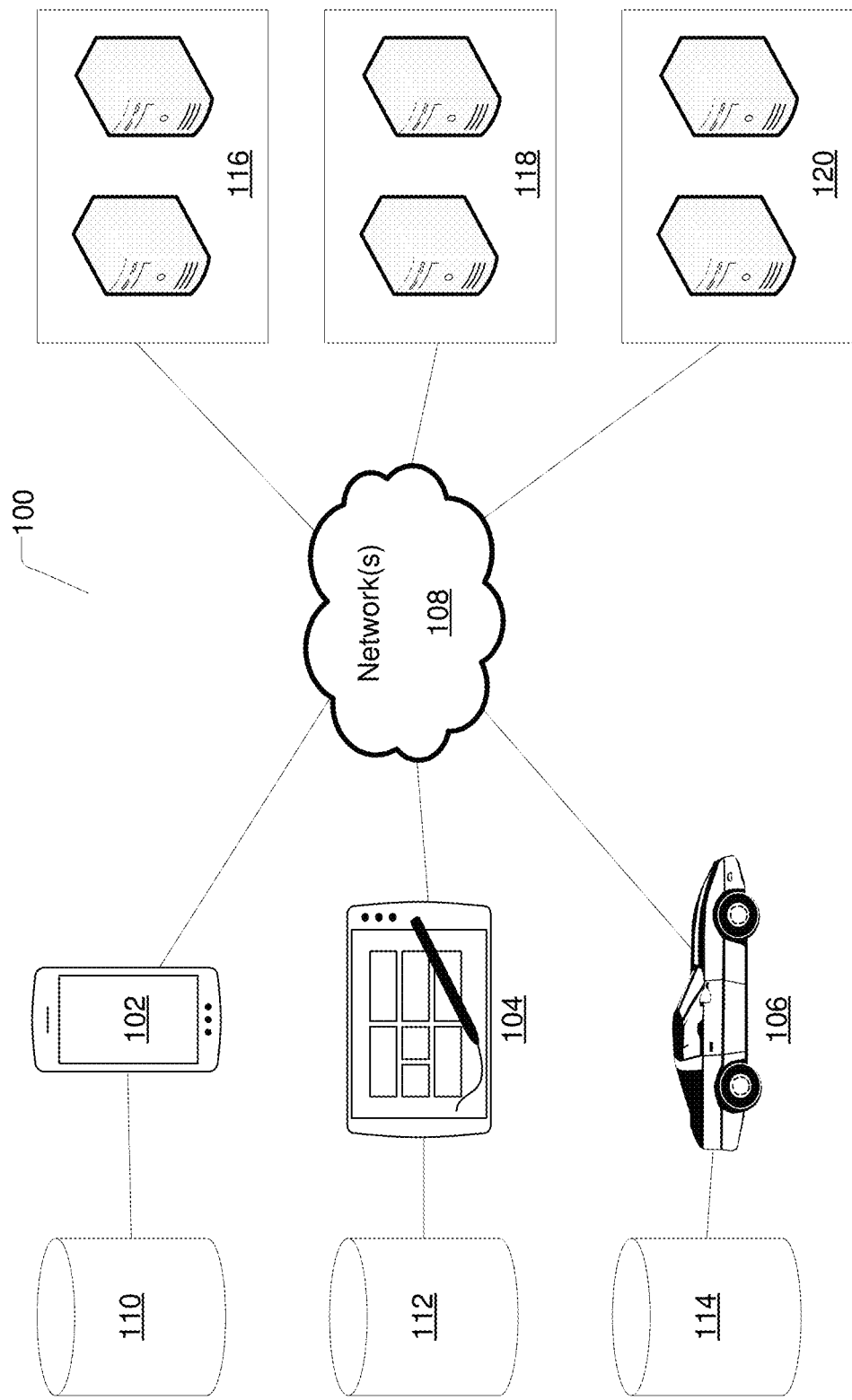
FIG. 1 illustrates an example of a distributed system for intelligent advertisement-based routing.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Embodiments of the present application are directed at systems and methods associated with intelligent computer systems that create routes for ride-sharing passengers based in part on locations of physical advertisements and real-time business data associated with the physical advertisements. Additionally, the routes are intelligently created based on user profile data and destination characteristics that can be, in some examples, extracted from at least one machine-learning classification algorithm.

In an example, a user may request a ride from a ride-sharing service. The vehicle that eventually picks up the user may be a human-operated vehicle, a fully autonomous vehicle, or a combination of the two. The user may input destination information and a desired time of arrival (DTA) into a user interface on an electronic device (e.g., mobile phone, laptop, etc.). The systems and methods described herein may receive this data and proceed to process the data to create an intelligent route. Based on the user profile data, the destination data, and the DTA data, the systems and methods described herein may first aggregate a list of potential advertisement locations along the route. Physical advertisements may include but are not limited to store fronts, billboards (e.g., electronic or non-electronic), signage, and transit ads (e.g., bus-stop advertisements), among other types of physical advertisements. The systems and methods may then winnow down the list of potential advertising locations based on user preferences, historical user data, the distance to the destination, the classification of the destination, and the DTA, among other factors. The application, which executes the systems and methods described herein, may generate the most cost-effective and relevant route for the user that still allows the user to arrive at the destination by the DTA.

Although the intelligent route may be longer than the most direct route, the intelligent route will expose the user-passenger in the ride-sharing vehicle to specific physical advertisements during the route. The cost of the ride-share to the user may be offset by the businesses wishing to advertise with the ride-sharing company. In other examples, the application running the systems and methods described herein may be able to communicate over a wireless network (e.g., 5G network) in real-time with certain businesses as the user is approaching and passing the physical advertisement locations. As a user approaches the GPS location of a physical advertisement, a business associated with the physical advertisement may transmit a real-time message or advertisement to the user's device (e.g., mobile phone). In other examples, the real-time message may be communicated directly to the ride-sharing vehicle and displayed within the vehicle on a screen (e.g., a screen mounted to the back of the driver or front-passenger seats, a screen embedded within a window, etc.). When the ride has concluded, a cost offset may be applied to the total trip charge that accounts for the level of advertisement exposure to the user. If the user elected to take a longer yet more advertisement-saturated ride, the user may pay less than a ride taking the quickest, most direct path without regard to physical advertisement locations and exposure.

Intelligent ad-based routing also improves the technical delivery of real-time electronic advertisements to devices. For instance, the systems and methods disclosed herein allow businesses to transmit real-time advertisements and messages to user devices based on the GPS location of the user devices. When a user is approaching or passing a certain physical location associated with a business, the geocoordinates of the user may be used to trigger sending a real-time advertisement or message to the user device. In other examples, the geocoordinates may be based on the vehicle in which the user is riding. For instance, in an autonomous vehicle with multiple interior screens, the geocoordinates of the vehicle may trigger the sending of a business's real-time advertisement or message to be displayed on the interior screens if the vehicle is within a defined physical proximity of a location associated with the particular business advertising within the vehicle.

By leveraging advanced wireless network capabilities, such as 5G networking, businesses are able to more efficiently transmit targeted advertisements to vehicular computers and user devices, while using less bandwidth and decreasing network latency. Furthermore, the systems and methods described herein are capable of delivering more relevant advertisements to users based on technical processing improvements by leveraging advances in machine-learning technology. Specifically, by aggregating user profile data, destination classification data, and DTA, relevant advertisements can be intelligently selected and delivered to the user in real-time.

It should be noted that the systems and methods described herein are not to be limited to just ride-sharing applications. A passenger riding in a non-ride-share vehicle (e.g., a user riding in a vehicle operated by the user's spouse) may be able to use the systems and methods described herein, as the advertisements can be directly sent to a user device or to a screen or screens located within the non-ride-share vehicle.

Current methods of electronic advertisement delivery do not consider physical advertisement locations that may be along a driving route to a particular destination. Rather, current methods rely on limited-targeted advertising; for instance, in most ride-sharing applications, the advertisements displayed in the application during the ride do not consider the real-time geocoordinates of the user device and/or the vehicle. The advertisements displayed are generic and, often, have no relevance to the changing physical surroundings of the user and the vehicle during the ride or the final destination.

Accordingly, a need exists to deliver more targeted and relevant advertisements through the creation of intelligent ad-based routes. The present disclosure provides a plurality of benefits to the technical infrastructure associated with real-time, targeted advertisement delivery, including but not limited to: decreasing the frequency of generic, non-targeted advertisements which, overall, decreases network bandwidth and latency; faster advertisement delivery using advanced wireless network technology (e.g., 5G) due to physical proximity of the user device, vehicle, and physical advertisement; and enabling users to utilize ride-sharing services more frequently due to the offset cost of businesses paying the ride-sharing company for targeted advertising, which will decrease traffic congestion on the roadways and improve the quality of roadways overall, among other examples.

FIG. 1 illustrates an example of a distributed system for creating intelligent advertisement-based routes ("ad-based routes"). Example system 100 presented is a combination of interdependent components that interact to form an integrated whole for creating ad-based routes. Components of the system may be hardware components or software implemented on, and/or executed by, hardware components of the systems. For example, system 100 comprises client devices 102 and 104, vehicular device 106, local databases 110, 112, vehicular database 114, network(s) 108, and server devices 116, 118, and/or 120.

Client devices 102 and 104 and vehicular device 106 may be configured to receive destination input data, DTA data, and user profile data. Additionally, devices 102, 104, and 106 may be configured to communicate with remote devices associated with third-party businesses over a wireless network, such as network(s) 108. Devices 102, 104, and 106 may also be configured to communicate with other client devices and vehicular devices. In aspects, a client device and/or vehicular device, such as devices 102, 104, and 106, may have access to one or more data sources comprising data related to the destination input, user profile, and possible advertisement locations along a certain route. The data sources may be local to, or external to, the client devices and/or vehicular device. The data related to destination input may include classification data that describes certain categories and sub-categories of characteristics associated with the destination. A more fulsome explanation of the classification data associated with a destination input is presented with respect to FIG. 3. The data related to a user profile may include but are not limited to user preferences (e.g., likes/dislikes), historical user data (e.g., past locations the user has visited), purchase history from third-party applications, advertisement interaction history, and demographic information, among other categories of data. The data associated with DTA may include but is not limited to current traffic data, geocoordinates of a particular route, and geocoordinates of candidate advertisement locations in proximity to a particular route.

As another example, the client devices and/or vehicular device may receive input data from the user and from various application programming interfaces (APIs) containing user profile data, destination data, and other relevant information. The data may be captured by the device and transmitted to one or more remote web servers or external data storage locations, such as server devices 116, 118, and/or 120. The client devices and/or vehicular device may be equipped with wireless cards capable of joining and communicating over advanced wireless networks, such as 5G.

In some aspects, the data that is received by the client/vehicular device(s) may be provided to one or more machine-learning (ML) models. A model, as used herein, may refer to a predictive or statistical utility or program that may be used to determine a probability distribution over one or more character sequences, classes, objects, result sets or events, and/or to predict a response value from one or more predictors. A model may be based on, or incorporate, one or more rule sets, machine learning, a neural network, or the like. In an example, the ML models may be installed on the client device, vehicular device, a server device, a network appliance (e.g., a firewall, a router, etc.), or some combination thereof. The ML models may process the data to determine the most relevant types of advertisements to display to a user, and based on such a determination, an intelligent ad-based route may be created. Determining which advertisements may be most relevant to a user may comprise analyzing a user profile and comparing demographic information of a user against a statistically significant dataset of individuals with similar demographic information. The determination of advertisement type and content to display to a user can also be based on historical user data, such as the nature of a user's past interaction with a certain type, category, or subject matter of an advertisement. A user may also select preferences manually, and the systems and methods described herein can obtain the user preference data and compare it to at least one ML model to extract further insights as to which types of advertisements may be most relevant and effective on a particular user. Based on the types of advertisements that are selected for the ad-based route, the client devices, vehicular device, and/or server device(s) may perform (or cause the performance of) one or more actions.

In some aspects, the user profile data, destination characteristics, and previously selected advertisement locations may be used to train the one or more ML models. For example, a set of labeled and/or unlabeled data may be used to train an ML model to identify the most relevant advertisements to a particular user. Relevance may be determined, in some examples, by considering how the user interacted with the advertisement (e.g., whether the user clicked on the advertisement when it appeared on the user's mobile device), the time the user spent engaged with the advertisement (e.g., how long a user watched an advertisement displayed on a screen measured via eye-gaze tracking through a built-in camera), and whether the user's subsequent actions were related to the advertisement (e.g., an advertisement for Restaurant X was displayed during the ad-based route, and the user subsequently dined at Restaurant X within a certain period of time after being exposed to the advertisement), among other examples. The training may include the use of one or more supervised or unsupervised learning techniques, including but not limited to pattern recognition techniques. The trained ML model may be deployed to one or more devices. As a specific example, an instance of a trained ML model may be deployed to a server device and to a client device. The ML model deployed to a server device may be configured to be used by the client device and/or vehicular device when, for example, the client device and/or vehicular device is connected to a wireless network. Alternatively, the ML model deployed to the client device may be configured to be used by the client device and/or vehicular device when, for example, the client device and/or vehicular device is not connected to the Internet. In such examples, the ML model may be locally cached by the client device and/or vehicular device.

Figure 2:
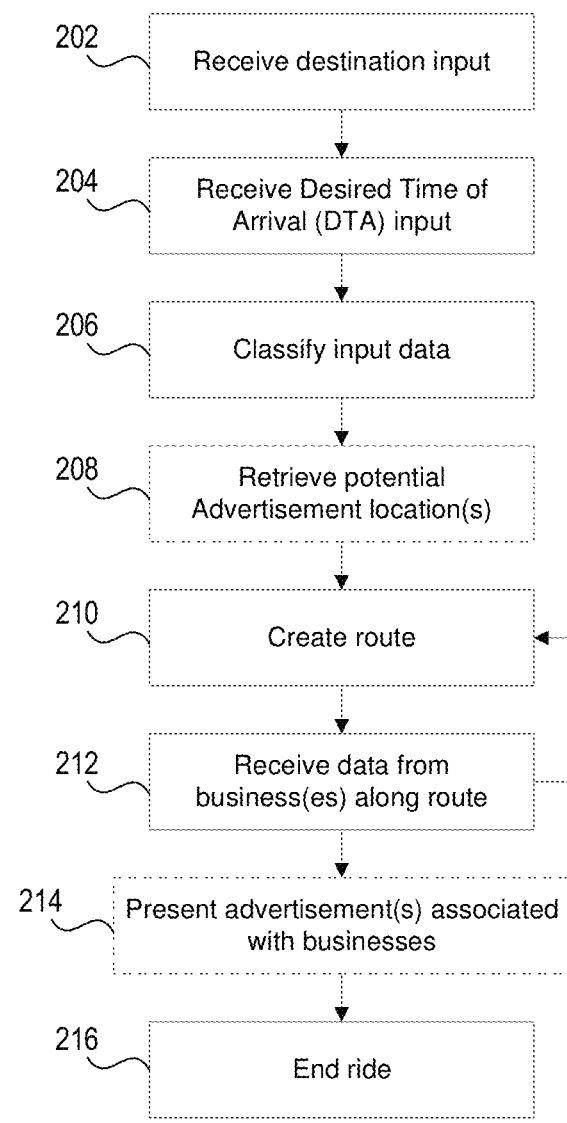
FIG. 2 illustrates an example method for creating an intelligent advertisement-based route.

FIG. 2 illustrates an example method for creating an intelligent advertisement-based route. FIG. 2 begins at operation 202 where the destination input is received by a client device (such as client devices 102/104) and/or a vehicular device (such as vehicular device 106). Destination input may comprise an address and/or a name (e.g., name of a company/business). Destination input may be manually input into an application user interface on a user device and/or a vehicular device, such as a touchscreen mounted to the back of a front driver or passenger seat in a vehicle. After destination input is received, the method proceeds to operation 204 where desired time of arrival (DTA) data is received. Similar to how destination input may be received on a client/vehicular device, DTA input may be received through an application user interface on a client device (e.g., through a mobile application) and/or a vehicular device (e.g., through a mounted touchscreen inside the vehicle). The DTA data may be utilized to determine the type of route to calculate. For instance, if the DTA is a later time than the time of arrival using a direct path to the destination, then the ad-based routing system disclosed herein may determine that a longer, more advertisement-saturated route is appropriate. If the DTA is within a small period of time of the calculated time of arrival using a direct path or if the DTA is earlier than the calculated time of arrival using a direct path, the system may automatically default to calculating a direct path to the destination without regard to an ad-based route. In some alternate embodiments, the calculation of a direct route may still use advertisement preferences and user profile data to calculate the best route. For instance, if two direct routes are nearly similar in time, then the route that contains the most relevant physical advertisements to the user may be selected by the system.

Once the destination and DTA input are received, the method then proceeds to operation 206 where the input data is classified. In addition to the destination input and DTA input received at operations 202 and 204, input data may also comprise user profile data. User profile data may comprise user preferences (e.g., likes/dislikes), historical user actions (e.g., previous destinations, interaction characteristics with previously displayed advertisements), and other relevant data to creating an intelligent ad-based route. During step 206, the destination may be classified. Specifically, the destination may be categorized based on industry, e.g., restaurant, grocery store, shoe store, doctor, etc. Sub-categories may also be used to further categorize a destination. For instance, within the restaurant category, a particular destination may be classified as a fast-food restaurant or a fine-dining restaurant. Similarly, a doctor's office may be classified as an optometrist or a chiropractor.

The DTA data may also be classified at operation 206. For instance, as described earlier, the DTA may be within a small period of time of or earlier than the calculated time of arrival for a direct route to the destination. In such instances, the DTA classification may take priority over other categories of data classification, and the route that is created is the fastest route with minimal to no regard to advertisement preferences. In other instances, the direct route to a destination may comprise more than one route. Such cases may cause the system described herein to compare the physical advertisement locations along each route and intelligently select the one that is most relevant to the user based on the destination classification and other user profile data.

At operation 206, user profile data may be received and classified along with the destination input data and DTA data. User profile data may be retrieved from previous information submitted to a user interface associated with the systems and methods presented herein, or, in alternate embodiments, user profile data may be retrieved using third-party APIs (e.g., pulling user profile data from a social media host, such as Facebook® or LinkedIn®). The classification of the input data is described in more detail with respect to FIG. 3.

Once the classification step is complete, potential advertisement locations are received at operation 208. The potential advertisement locations are intelligently selected at operation 206 based on the processing of the destination, DTA, and user data. The potential advertisement locations received at operation 208 may be ranked in order of most relevant to least relevant based on the processed data from operation 206. The potential advertisement locations may also be ranked by relevance based on the type of route created in regard to the DTA (e.g., most relevant advertisement locations are the ones located along the roadways that comprise the most direct route to the destination).

After the potential advertisement locations are received, a route is created at operation 10. The ad-based route is created based on the destination input, DTA, user profile data, and the received candidate advertisement locations from operation 208. In one example aspect, the route may be classified as a direct route, a minor detour, an average detour, a major detour, or free. The direct route may be defined as the shortest, possible route. On a direct route, physical advertisement locations may or may not be present. As mentioned previously, however, multiple direct routes may exist. In such instances, the systems and methods disclosed herein may take into account the classification results from operation 206 and choose the direct route that contains the most relevant advertisement locations to the user.

The detour routes (minor, average, and major) take the user by a set of physical advertisement locations that were intelligently selected at operation 206 that the user otherwise would not have been exposed to if the user took a direct route to the destination. A minor detour route is a route that may contain a small amount of detour time (e.g., 5 minutes). An average detour route is a route with an average amount of detour time (e.g., 10-15 minutes). A major detour route is a route with a large amount of detour time (e.g., 20-30 minutes). The larger the amount of detour time, the lower the cost of the ride because businesses are paying the ride-sharing company to drive the user past the physical advertisement locations associated with particular businesses. As such, a major detour provides a user the maximum amount of cost-savings for a ride. A "free" route may be designed to take the user past as many physical advertisement locations as possible for the ride to be free of charge. Typically, a "free" route is created without regard to DTA data.

Once the initial ad-based route is created, the ride begins. During the ride, the client device and/or vehicular device may receive data from businesses associated with the physical advertisements along the route. Real-time business data may be received that prompts a change in the route to the destination (return to operation 210). For example, the input data received and classified at operation 206 may become outdated along the route. Specifically, a business associated with a physical advertisement location along the route that was initially chosen at operation 208 may be closed by the time the user is expected to pass by the geocoordinate of the advertisement. In other instances, the business itself may manually "turn-off" its physical advertisement location shared with the ride-sharing application. The systems and methods disclosed herein are configured to allow businesses to register and de-register physical advertisement locations with the ride-sharing application. As such, when a business, for whatever reason, decides it no longer wants to pay the ride-sharing company to feature its candidate physical advertisement location(s), the advertisement location(s) may be de-registered. During a ride, if a certain physical advertisement location was initially selected at operation 208 but the business subsequently de-registers its location during the ride but before the vehicle has approached and past the geocoordinates of the advertisement location in question, then the intelligent ad-based routing system disclosed herein may return to operation 210 and the ad-based route may automatically update, re-routing the vehicle and user to another physical advertisement location that is currently registered with the ride-sharing application.

In yet further examples, certain sensors associated with the physical premises of a business may indicate if a business is adequately busy or not. Such sensors may transmit data in real-time to the intelligent ad-based routing system, e.g., via wireless network(s) 108. Based on this real-time data, the ad-based routing system may re-route the vehicle and user and proceed back to operation 210. For example, a restaurant may be experiencing higher than usual traffic. If the restaurant establishment was initially selected as a potential advertisement location at operation 208 and placed on the initial route at operation 210, the ad-based routing system disclosed herein may automatically update the route prior to the vehicle and user approaching and passing the restaurant and its associated physical advertisement(s) (e.g., a restaurant sign or storefront). The updated route may be triggered because of the restaurant's level of busyness. If the restaurant is already at maximum capacity, then it may not want to spend more money on real-time advertising via a ride-sharing application to attract customers to come in for a meal.

In such an example, the cost of the ride may dynamically change for the user. Here, because the restaurant is no longer desiring to spend money on advertising (because the restaurant is at maximum capacity), the user is not going to receive a cost offset from the restaurant for the ride. Generally, the cost offset of a ride will be larger for a user when a business is at low capacity, and the cost offset will be smaller for a user when a business is at high capacity. Other variables that may dynamically affect the cost of a ride may include, but are not limited to, the time of day, day of week, weather, surrounding activities/events, and quality of external signage. For example, a business that opens at 11 am for lunch will likely advertise more between the hours of 11 am and 12 pm than between 12 pm and 1 pm (prime lunch time), presumably because the traffic of customers will be lower at 11 am and higher at 12 pm. As such, a user riding past the business between 11 am and 12 pm will experience a greater dynamic cost offset to the total cost of the ride than a user riding past the business between 12 pm and 1 pm. Similarly, in a torrential downpour, visibility outside of the vehicle may be obstructed. During such weather events, the dynamic cost offset may decrease because businesses do not want to pay more for advertising when the user-passenger in the vehicle cannot see the storefront or sign of the business as the car drives past the storefront/sign.

In other examples, surrounding activities and events may prompt dynamic changes in the overall cost of a ride. For instance, if construction is occurring in front of a business, the business may increase its advertising spend to compensate for the expected loss of traffic to the business due to the construction. In such an instance, the dynamic cost offset may be larger than usual for a user riding past the business because of the surrounding construction activity. Alternatively, construction in front of a business may prompt a business to decrease its advertising spend if the business believes that the physical construction surrounding the business will be a nuisance to new customers, and therefore, the business does not want to attract new customers during construction. As such, the dynamic cost offset may be smaller than usual for a user riding past the business because of the surrounding construction activity. In another example, a convenience store might increase its advertising spend in the time leading up to a local sporting event. For instance, on a hot summer day, prior to a sporting event, many people may be traveling to a sports stadium via a ride-share. The convenience store, which may be in proximity to the stadium, may increase its advertising spend during this time to prompt the sports fans to buy a water or sports drink prior to entering the stadium. As such, the dynamic cost offset of a user riding past the convenience store may be larger during this time leading up to a sporting event as compared to normal business hours when a sporting event is not scheduled.

The process of receiving advertising and cost offset data from businesses along the route (and possibly cycling between operation 210 and 212) continues until the vehicle arrives at the destination.

If the data received from a business along the route at operation 212 does not prompt a change in the initial route, the method proceeds to operation 214. At operation 214, a business may want to transmit a real-time advertisement and/or message to a client device associated with the user or a vehicular device inside of the vehicle. For example, one of the potential advertisement locations that may have been selected at operation 208 is a clothing store. The data received from the clothing store at operation 212 may indicate to the intelligent ad-based routing system that the clothing store is open, operating at a slower-than-normal level of busyness, and currently offering a sale on a particular style of t-shirt. As the vehicle is approaching the clothing store, the user may look out of the vehicle and see the physical storefront of the clothing store. At the same time, the user may receive (on a client device 102/104 or on a vehicular device 106, such as a screen within the vehicle) an advertisement and/or message from the clothing store. The advertisement and/or message from the clothing store received at operation 214 may take the form of a text-message advertisement, a visual advertisement (image or video) displayed on a screen inside the vehicle, an audio advertisement broadcasted over speakers inside the vehicle, augmented reality (AR) advertisements (e.g., the windows on the vehicle may be configured to display AR graphics that overlay the outside physical world perceived from inside of the vehicle), and/or a combination of the aforementioned advertisement types or any other feasible advertising medium.

In some instances, an advertisement displayed within the vehicle (e.g., an image or video displayed on an in-vehicle screen) may prompt the user to purchase an actual product from inside the vehicle from a distribution mechanism built into the vehicle (e.g., a mobile vending machine). For example, in the context of the clothing store advertisement, the vending machine may be stocked with a certain t-shirt of various sizes that is sold at the clothing store. As the user is riding past the clothing store, the clothing store may transmit an advertisement message via a shared wireless network (e.g., network(s) 108) to vehicular device 106. The advertisement may be displayed on a screen within the vehicle, prompting the user to purchase the particular t-shirt from the vending machine inside the vehicle. The user may accept the offer and purchase the t-shirt (e.g., via mobile payment applications and/or credit card), or the user may decline/ignore the offer.

During the ride, electronic advertisements and/or messages from the businesses that are past along the route may continue to be received by the client device(s) and/or vehicular device, at operation 214. This process continues until the vehicle and user arrive at the destination. Along the route, an advertisement may be displayed on a user's mobile device (e.g., mobile phone). The advertisement may be displayed according to the real-time GPS location of the user and an advertisement data transmission rate. An advertisement data transmission rate is a measurement of time for obtaining elements of an advertisement. In low-bandwidth networks, the advertisement data transmission rate is slow, whereas in high-bandwidth networks, the advertisement data transmission rate is fast. The display of an advertisement on a client device accounts for the real-time advertisement data transmission rate based on the current strength of the surrounding wireless networks.

Once the vehicle and user arrive at the destination, the intelligent ad-based system may proceed to end the ride at operation 216. At operation 216, the ride may be terminated automatically (e.g., based on arriving within a certain radius of the geocoordinates of the destination, based on sensing the user physically exiting the vehicle, etc.) or manually (e.g., a human operator clicks "End Ride" on a ride-sharing application). Upon conclusion of the ride, the user may remit payment to the ride-sharing service via a secure payment method, such as a blockchain ledger or other secure payment means.

Figure 3:
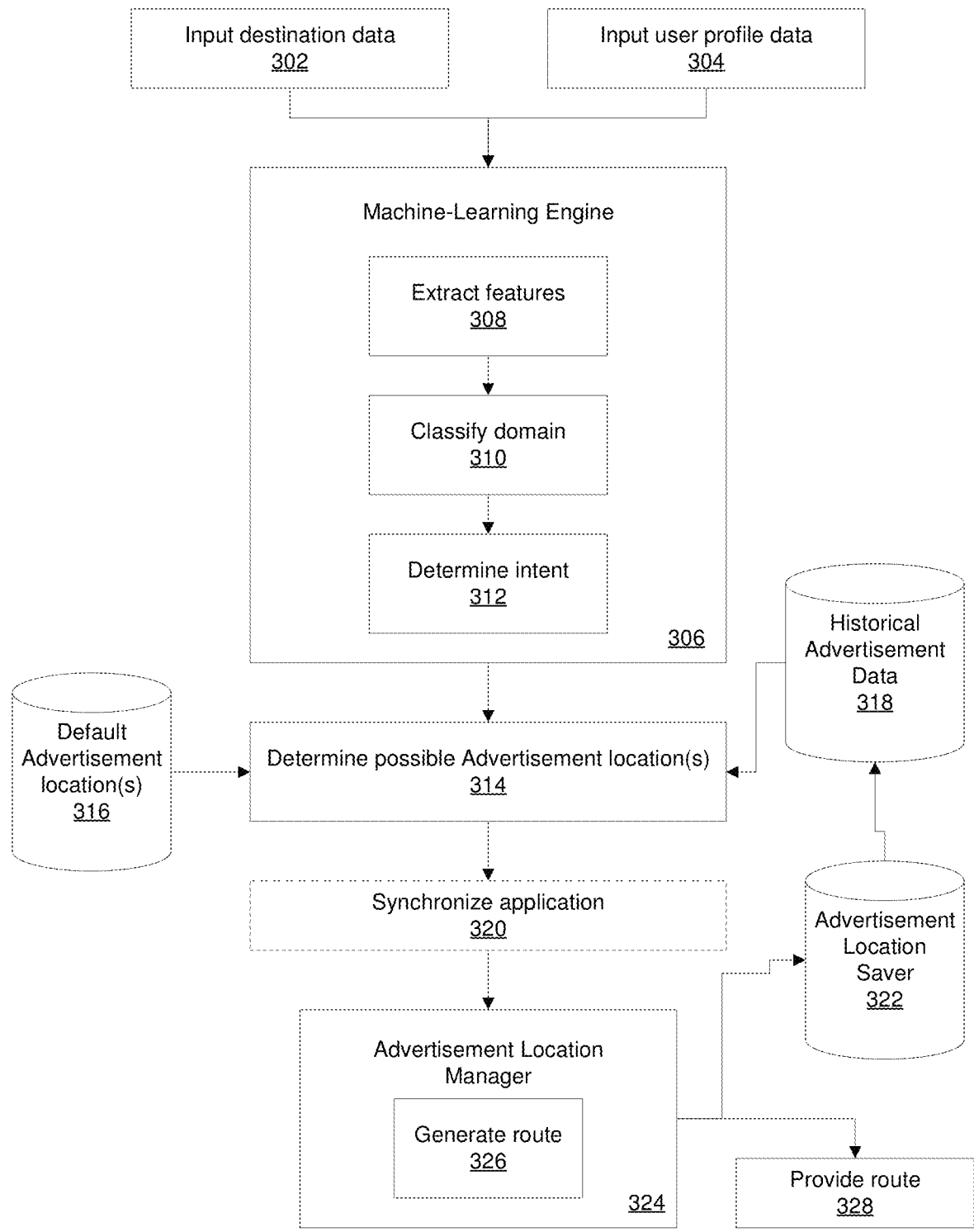
FIG. 3 illustrates an example method for classifying input data to intelligently select advertisement locations along a route.

FIG. 3 illustrates an example method for classifying input data to intelligently select advertisement locations along a route. As can be appreciated by one of ordinary skill in the art, the operations described with respect to FIG. 3 may be performed locally, remotely, or on a combination of devices. For instance, all of the steps described in FIG. 3 may be performed locally on a client device, such as client devices 102 and/or 104. The method steps of FIG. 3 may also be performed solely within a vehicular device, such as vehicular device 106. In other aspects, the steps of FIG. 3 may be performed on one or more remote device, such as remote web server(s) 116, 118, and/or 120. In yet other examples, the steps of FIG. 3 may be performed on a combination of client devices, vehicular devices, and remote web servers all communicating over a shared wireless network, such as network(s) 108.

FIG. 3 begins at operations 302 and 304, where destination input data and user profile data are received by a device. The data may be received by a client device, vehicular device, or a remote web server device. In the instance of a remote web server, the destination input data and user profile data may be received initially from a client device and/or vehicular device and then transmitted via a wireless network (network(s)108) to a remote web server device, where the remote web server device receives the destination input and user profile data. The destination data and user profile data may be converted into particular data representations that may be understood and processed by a machine utilizing machine-learning algorithms (e.g., ML Engine 306) to intelligently disassemble the destination and user profile data and provide the most appropriate physical advertisement locations along the route.

The destination data and user profile data may be transmitted to Machine-Learning (ML) Engine 306, where the data may be used to train at least one ML model and/or compared against an already-trained ML model or models. In some aspects, the first operation in ML Engine 306 may be extract features operation 308. At operation 308, certain features may be extracted from the destination data and user profile data, including but not limited to contextual features and lexical features. For instance, the lexical features that may be analyzed include, but are not limited to, word n-grams that may appear in social media status updates, text messages, emails, and/or other text-based user profile data. A word n-gram is a contiguous sequence of n words from a given sequence of text. For instance, a particular social media update earlier in the day from the user may state: "Enjoyed getting lunch with Bob this afternoon. The burger was great!" The word n-gram that may be extracted in this instance is "burger was great." The intelligent ad-based routing system now knows that the user has already eaten a burger for lunch, and therefore, the system may de-prioritize restaurant advertisements displaying hamburgers during the creation of the route. In other words, restaurants serving burgers may be less optimal advertisement locations to display to a user who has already eaten a burger earlier that same day. As should be appreciated, analyzing word n-grams may allow for a deeper understanding of the user and therefore provide more accurate and intelligent advertising location suggestions to display along a route. The machine-learning algorithms from ML Engine 306 may be able to compare thousands of n-grams, lexical features, and contextual features in a matter of seconds to extract the relevant features of a social media, text, and/or email message. Such rapid comparisons are impossible to employ manually.

The contextual features that may be analyzed at operation 308 may include, but are not limited to, a top context and an average context. A top context may be a context that is determined by comparing the topics and keywords of text-based input data (e.g., social media update, text message, email, destination description on a search engine, etc.). to a set of preloaded contextual cues. An average context may be a context that is determined by comparing the topics and keywords of historical processed text-based input data, historical advertisement location data and advertisement interaction data, user profile data (e.g., scraped from publicly facing social media websites), and other data. The feature extraction operation 308 may also skip contextually insignificant data when analyzing the input. For example, a string token in a message input may be associated with articles, such as "a" and "an." However, because articles are typically insignificant in the English language, the feature extraction operation 308 may ignore these article tokens.

In other examples, the destination input data 302 may comprise images of the restaurant. These images may be provided by the destination to a public search engine (e.g., Google®), or these images may be provided by previous customers to a public business directory service (e.g., Yelp®). ML Engine 306 may be configured to not only process text-based data, but also process image data. At operation 308, features that may be extracted from an image include, but are not limited to, objects. These objects may be identified at operation 308 by applying an image recognition algorithm stored within ML Engine 306. The image recognition algorithm may be able to identify objects, such as food items from a restaurant destination, clothing items from a clothing store, and electronics products from a technology store, among other examples.

Once the features are extracted at operation 308, the domain of the input is classified at operation 310. The features that were extracted at operation 308 may be grouped together into specific classifiers for further analysis at operation 310. Specifically, classifying the domain of the extracted features at operation 310 may utilize statistical models or predefined policies (i.e., prior knowledge, historical datasets) to determine the proper domain of classification. For example, if a user input a golf store as the final destination into the ride-sharing application, one of the features that may have been extracted at operation 308 was a golf club object (from an image) and/or a word n-gram describing "golf clubs, shoes, and accessories." At operation 310, the word "golf" may be associated with a broader domain classification such as a "sports" domain.

At operation 312, the intent of traveling to the destination may be determined. For example, historical user data may indicate that the user is not a frequent golfer, so the system may assume the likelihood of the user going to a golf store to purchase an object for him/herself is low. Considering the user profile data 304 and the features extracted at operation 308 (e.g., via public social media postings), however, reveals that the brother of the user is a golf aficionado. Further, the data extracted from the user profile data indicates that the user's brother's birthday is next week. As such, an intent for traveling to the destination may be assumed as "golf gift for brother's birthday." It should be appreciated that multiple intents may be predicted at operation 312.

After the features are extracted at operation 308, domains classified at operation 310, and an intent or intents determined at operation 312, the system may determine candidate advertisement locations to display along a route to the destination at operation 314. Continuing from the earlier golf example, the user may be traveling to a golf shop as the final destination. As previously mentioned, a possible domain classification for the golf shop is "sports." As such, other businesses with physical advertisements along the possible route that are also classified as "sports" domains may be more relevant advertisements to display to the user. In other aspects, however, based on the determined intent from operation 312, the user may be traveling to the golf shop to purchase a birthday present for his/her brother. In such an instance, the possible advertisement location(s) determined at operation 314 may prioritize locations such as a cake shop and/or a card store over "sports" stores.

Additionally, at operation 314, the advertisement locations that are determined along the route may also be determined using historical advertisement data 318. For instance, if a particular advertisement along a certain route has elicited low engagement from the user, then that advertisement may not be selected to be displayed along the route. In other examples, certain domains of physical advertisements may have a historically low engagement rate from the user. Such physical advertisements will have a lower priority of being selected to be displayed along a route as compared to high-engagement advertisements. In some instances, no historical advertisement data may be available for a particular route or a particular user. In such instances, default advertisement location data 316 may be utilized in determining which advertisements to display along a particular route. The default advertisement location data may be based on the highest-paying businesses to the ride-sharing service, in some examples. In other instances, the default advertisement data may be based on average customer ratings of publicly available business directory services or search engines.

After possible advertisement locations are selected at operation 314, the method proceeds to optional step 320 where the application is synchronized with the selected advertisement locations. Step 320 occurs during a re-routing (e.g., cycling between operation 212 and operation 210 from FIG. 2). After an initial route is programmed into the application, any changes to that route may require the application to synchronize to the new determined advertisement locations. As such, the new advertisement locations are provided to the application, and the application is synchronized at operation 320.

Following the determination of the advertisement locations at operation 314 and/or the synchronization of the application operation 320, the advertisement locations and/or synchronized application data are provided to advertisement location manager 324 that generates a route at operation 326. Based on the DTA data and determined advertisement locations, a route is generated at operation 326. After the route is generated at operation 326, the route data is provided at operation 328 to the application running on the client device 102/104 and/or vehicular device 106 via wireless network(s) 108. The generated route data and determined advertisement locations are also provided to a database 322 where advertisement location and route data are stored and used to update the historical advertisement database 318. The updated historical advertisement database 318 is then used in future calculations of determining the most relevant and appropriate advertisements to display along a route to a user.

Figure 4:
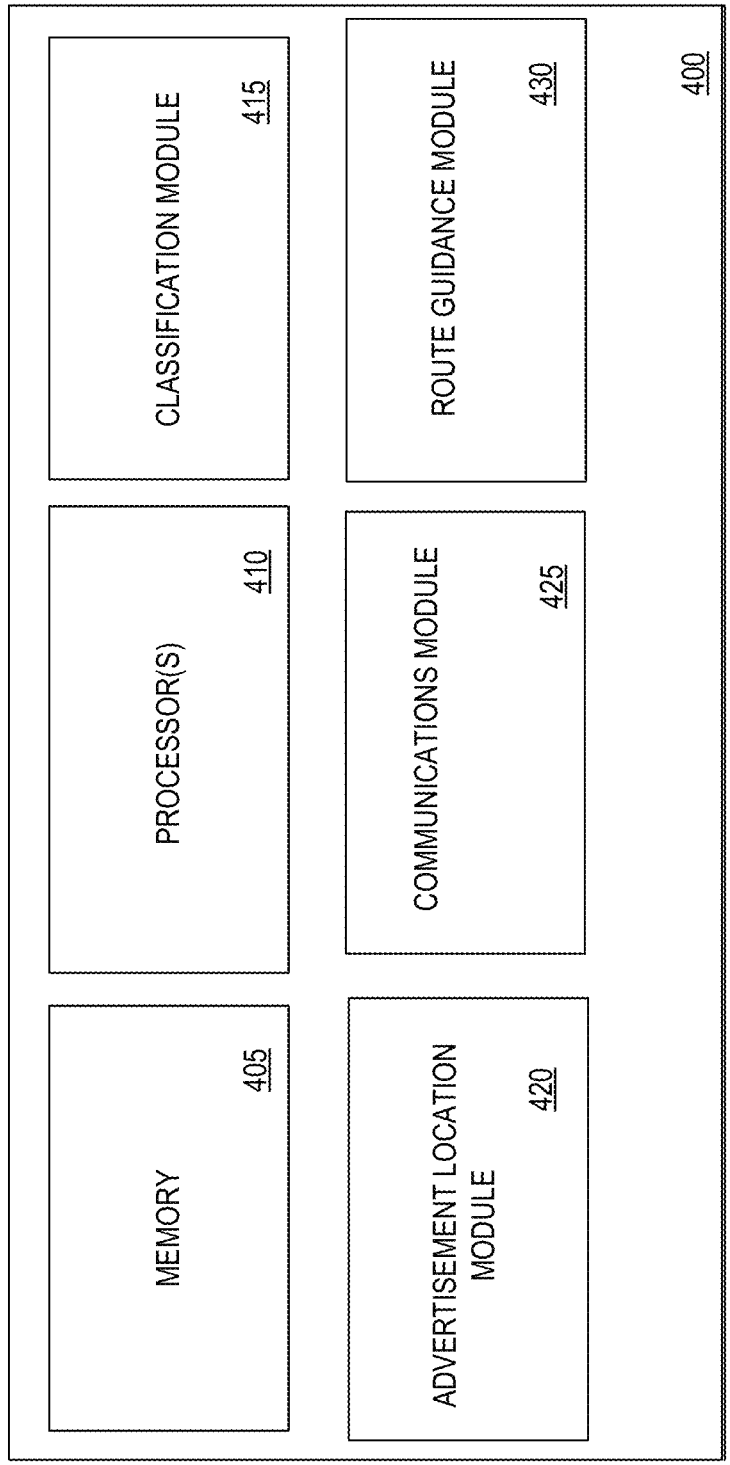
FIG. 4 illustrates an example architecture of an input processing system according to some embodiments of the disclosed technology.

FIG. 4 illustrates an example architecture of an input processing system according to some embodiments of the disclosed technology. Input processing system 400 may be embedded within a client device (e.g., client devices 102 or 104) and/or a vehicular device (e.g., vehicular device 400) and/or on a remote web server device (e.g., devices 116, 118, and/or 120). The input processing system contains one or more data processors and is capable of executing algorithms, software routines, and/or instructions based on processing data provided by a variety of sources related to the intelligent selection of an ad-based route. The input processing system can be a factory-fitted system or an add-on unit to a particular device. Furthermore, the input processing system can be a general-purpose computer or a dedicated, special-purpose computer. No limitations are imposed on the location of the input processing system relative to a client, vehicular, and/or remote web server device. According to embodiments shown in FIG. 4, the disclosed system can include memory 405, one or more processors 410, classification module 415, advertisement location module 420, communications module 425, and route guidance module 430. Other embodiments of the present technology may include some, all, or none of these modules and components, along with other modules, applications, data, and/or components. Still yet, some embodiments may incorporate two or more of these modules and components into a single module and/or associate a portion of the functionality of one or more of these modules with a different module.

Memory 405 can store instructions for running one or more applications or modules on processor(s) 410. For example, memory 405 could be used in one or more embodiments to house all or some of the instructions needed to execute the functionality of classification module 415, advertisement location module 420, communications module 425, and route guidance module 430. Generally, memory 405 can include any device, mechanism, or populated data structure used for storing information. In accordance with some embodiments of the present disclosures, memory 405 can encompass, but is not limited to, any type of volatile memory, nonvolatile memory, and dynamic memory. For example, memory 405 can be random access memory, memory storage devices, optical memory devices, magnetic media, floppy disks, magnetic tapes, hard drives, SIMMs, SDRAM, RDRAM, DDR, RAM, SODIMMs, EPROMs, EEPROMs, compact discs, DVDs, and/or the like. In accordance with some embodiments, memory 405 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 405.

Classification module 415 may be configured to run a portion of the operational steps described in FIG. 3. Module 415 receives destination data and user profile data and transmits that data to a machine learning engine. The machine-learning engine may be housed within classification module 415. After the input data is processed through the machine-learning engine, the data is classified based on extracted features, domains, and intent. In some embodiments, classification module 415 may be configured with more than one machine-learning engine, so that processing of the input data can occur in tandem, and classification results can be produced faster. In some embodiments, the classification module 415 is configured to communicate with third-party applications and application programming interfaces. Such communication may allow classification module 415 to receive certain user profile data that may not be available natively through the intelligent ad-based routing application.

Advertisement location module 420 is configured to receive the classification data from classification module 415 and subsequently locate the most relevant and appropriate physical advertisements to display along a route to a user. Advertisement location module 420 may be configured to access local and/or remote databases that contain historical advertisement location and interaction information. For instance, advertisement location module 420 may rely on historical data about a user's engagement level with a particular type of advertisement in determining the physical advertisements to display along the route. Further, advertisement location module 420 is configured to retrieve default advertisement data from a local and/or remote database in the case that historical data is unavailable for a particular user and/or route.

Communications module 425 is associated with sending/receiving information (e.g., collected and classified by classification module 415) with other client devices, vehicular devices, and/or remote servers. These communications can employ any suitable type of technology, such as Bluetooth, WiFi, WiMax, cellular (e.g., 5G), single hop communication, multi-hop communication, Dedicated Short Range Communications (DSRC), or a proprietary communication protocol. In some embodiments, communications module 425 sends information classified by classification module 415 and advertisement location data from advertisement location module 420.

Route guidance module 430 is associated with the functionality of driving a vehicle on a prescribed ad-based route, including modifying the route of the vehicle based on real-time business information that is received by classification module 415. As described previously, real-time business data may be received by the ad-based routing system disclosed herein. Based on the received business data, the ad-based route may be updated in real-time. For instance, a business may be closed by the time the user and vehicle are scheduled to pass the physical advertisement associated with that business, and therefore, the intelligent ad-based routing system changes the route so that the user is exposed to a physical advertisement of a business that is currently open. In some embodiments, route guidance module 430 may be associated with the driving functionality of an autonomous vehicle, ensuring that the autonomous vehicle is driving according to a path calculated by the intelligent ad-based routing system according to data classified by classification module 415 and geocoordinates of physical advertisements determined by advertisement location module 420.

Figure 5A:
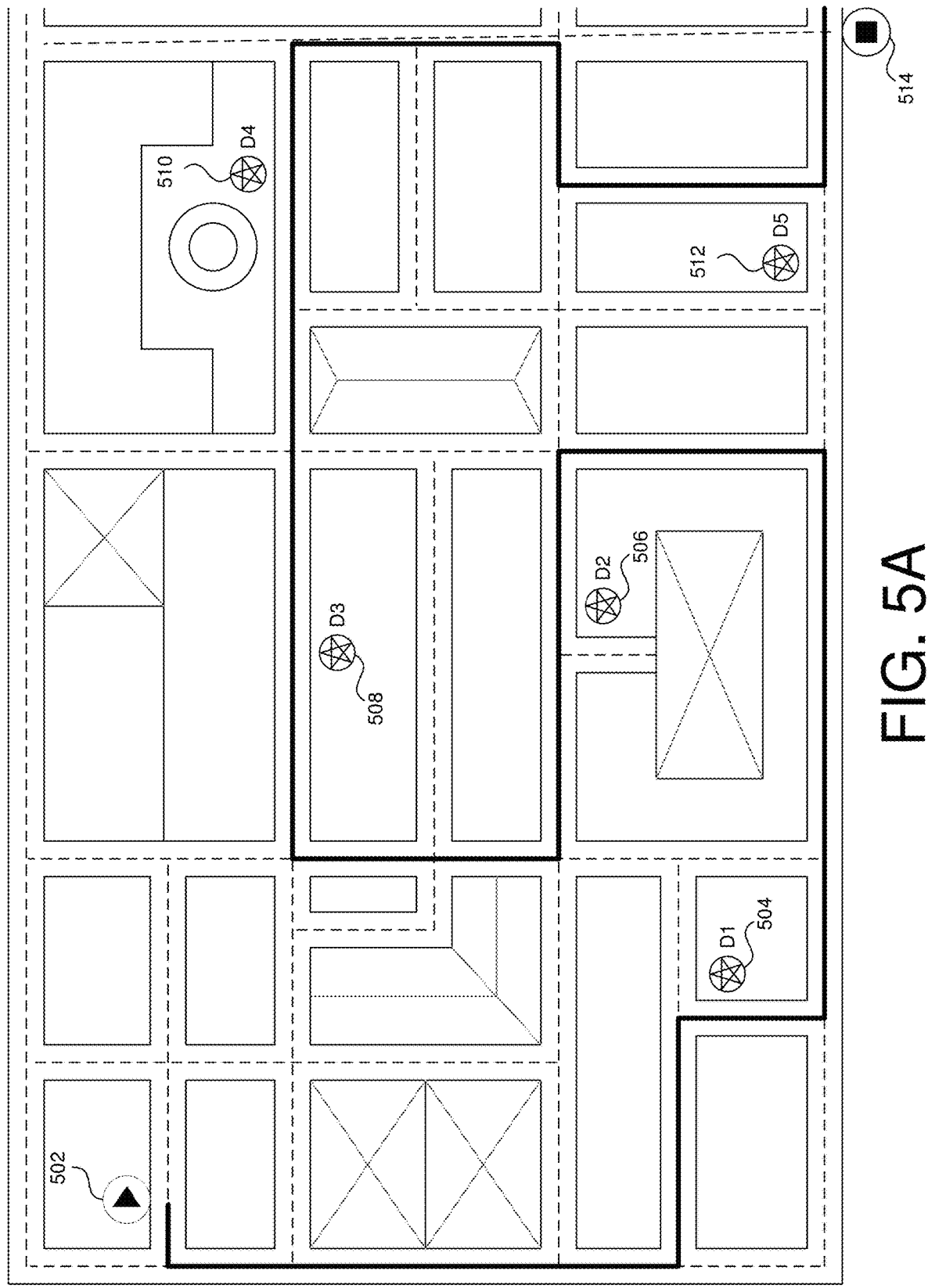
FIG. 5A illustrates a Major Detour Route.

FIG. 5A illustrates a Major Detour Route. In one example route, a user may be picked up at start location 502. Prior to pick-up, a user may enter a destination and DTA into a user interface associated with the intelligent ad-based routing application described herein. The destination and DTA data may be processed along with user profile data to create the most relevant, cost-effective ad-based route. Based on the DTA submitted by the user, the ad-based routing system may determine that a major detour route is the most relevant and cost-effective route, since the user will still arrive at final destination 514 at or before the DTA taking the major detour route. The major detour route may take the user past physical advertisements 504, 506, 508, 510, and 512 before reaching final destination 514. Physical advertisements 504, 506, 508, 510, and 512 may have been determined by the intelligent ad-based routing system using classification data of the destination, historical data about the user, and other relevant reference points.

During the ride, the user may have received various advertisements and/or messages from businesses associated with advertisement locations 504, 506, 508, 510, and 512. As previously described, these advertisements/messages may have been communicated over a shared wireless 5G network (such as network(s) 108) and transmitted directly to a user device and/or vehicular device.

Figure 5B:
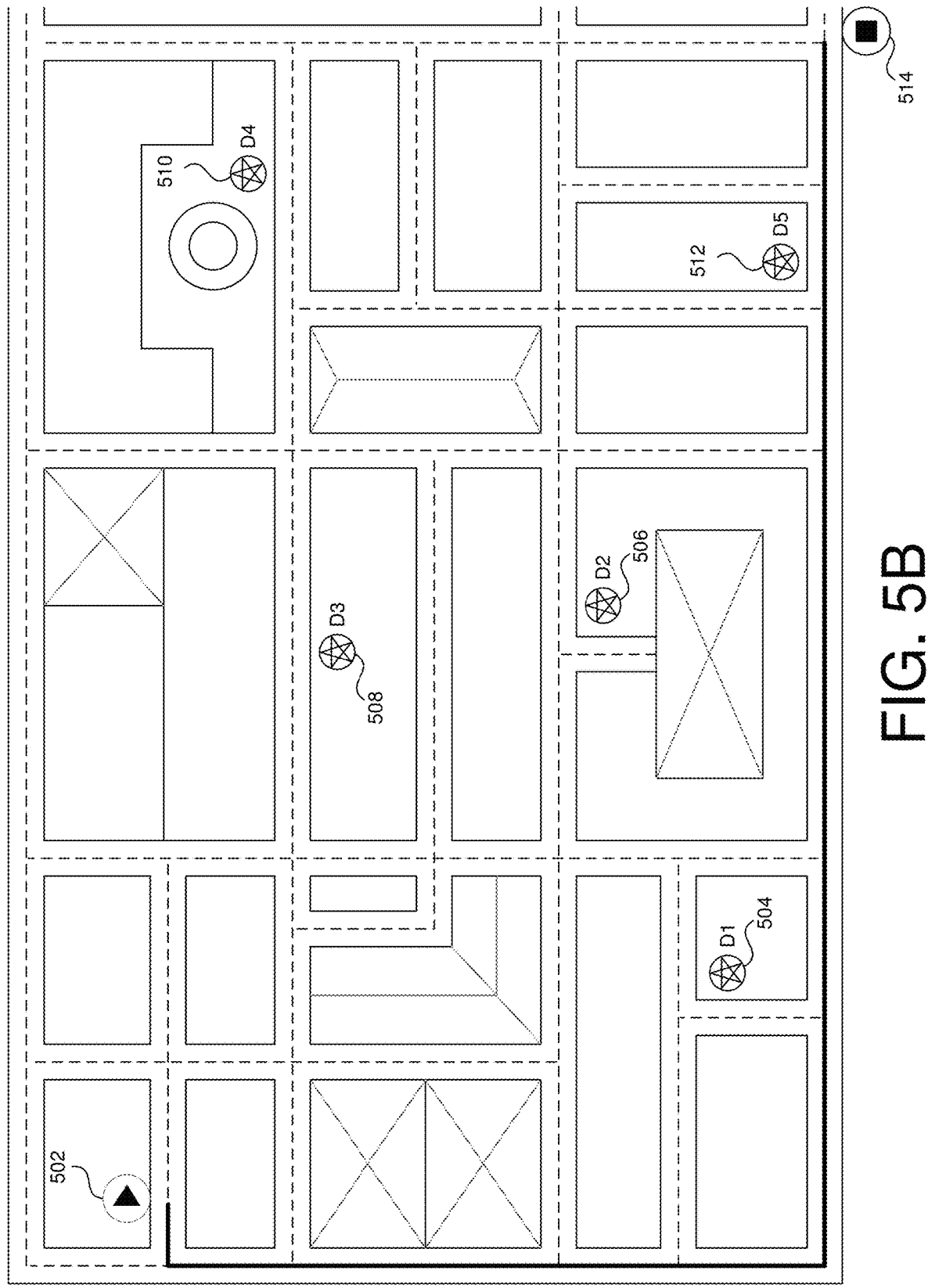
FIG. 5B illustrates a Direct Route.

FIG. 5B illustrates a Direct Route. In other examples, based on the destination input and DTA, the intelligent ad-based routing system may select the shortest possible route for the user—a direct route. The direct route, as illustrated, only takes the user past physical advertisement 512 and partially, advertisement 504. In exchange for less exposure to physical advertisements and quicker arrival times, a user may pay a higher price for a direct route as compared to a detour route, such as a major detour route illustrated in FIG. 5A.

Figure 6:
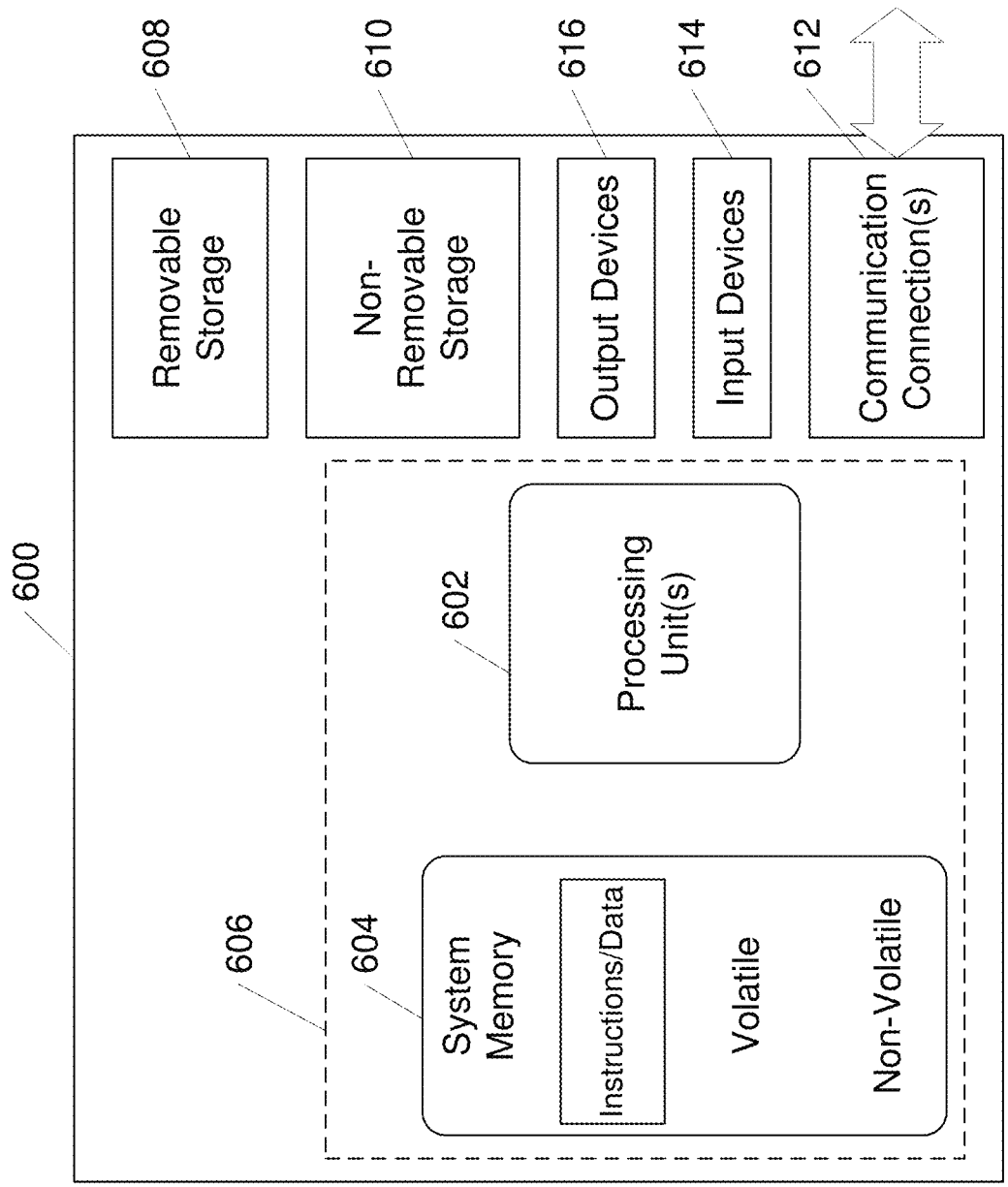
FIG. 6 illustrates one example of a suitable operating environment in which one or more of the present embodiments may be implemented.

FIG. 6 illustrates one example of a suitable operating environment in which one or more of the present embodiments may be implemented. This is only one example of a suitable operating environment and is not intended to suggest any limitation as to the scope of use or functionality. Other well-known computing systems environments, and/or configurations that may be suitable for use include, but are not limited to, personal computers, server computers, handheld or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 600 typically includes at least one processing unit 602 and memory 604. Depending on the exact configuration and type of computing device, memory 604 (storing, among other things, information related to detected devices, advertisement data, association information, personal gateway settings, and instructions to perform the methods disclosed herein) may be volatile (such as RAM), non-volatile (such as ROM, flash memory, etc.), or some combination of the two. This most basic configuration is illustrated in FIG. 6 by dashed line 606. Further, environment 600 may also include storage devices (removable 608 and/or non-removable 610) including, but not limited to, magnetic or optical disks or tape. Similarly, environment 600 may also have input device(s) 614 such as keyboard, mouse, pen, voice input, vehicular sensors, etc. and/or output device(s) 616 such as a display, speakers, printer, vehicular parts (e.g., wheels, transmission, etc.), etc. Also included in the environment may be one or more communication connections, 612, such as 5G, Bluetooth, WiFi, WiMax, LAN, WAN, point to point, etc.

Operating environment 600 typically includes at least some form of computer readable media. Computer readable media can be any available media that can be accessed by processing unit 602 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM EEPROM, flash memory or other memory technology, CD-ROM, digital versatile disks (DVD) or other optical storage, magnetic cassettes, magnetic tape, magnetic disk storage, or other magnetic storage devices, or any other tangible medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The operating environment 600 may be a single computer (e.g., mobile computer and/or vehicular computer) operating in a networked environment using logical connections to one or more remote computers. The remote computer may be a personal computer, a server, a router, a network PC, a peer device, a vehicular computer, or other common network node, and typically includes many or all of the elements described above as well as others not so mentioned. The logical connections may include any method supported by available communications media. Such networking environments are commonplace in offices, enterprise-wide computer networks, intranets, and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and the alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A computer-implemented method for generating advertisement-based routes comprising:
    receiving a destination;
    receiving a desired time of arrival;
    receiving user profile data associated with a user;
    processing the destination, desired time of arrival, and user profile data utilizing at least one machine-learning algorithm;
    comparing the processed data to at least one database of physical advertisements geographically located in proximity to the destination;
    based on the comparison of the processed data to the at least one database of physical advertisements geographically located in proximity to the destination, generating a first advertisement-based route and an estimated time of arrival associated with the first advertisement-based route;
    receiving location data associated with at least one ride-share vehicle transporting the user and synchronized business data associated with at least one physical advertisement location along the first advertisement-based route;
    based on the location data associated with the at least one ride-share vehicle transporting the user and the synchronized business data associated with the at least one physical advertisement location along the first advertisement-based route, generating a second advertisement-based route; and
    dynamically re-routing the at least one ride-share vehicle to the second advertisement-based route.

2. The method of claim 1, further comprising:
    presenting at least one electronic advertisement from a business associated with the at least one physical advertisement location;
    recording at least one user interaction with the at least one electronic advertisement; and
    saving the at least one user interaction in a database for future processing.

3. The method of claim 2, wherein the at least one user interaction is measured according to at least one of: an engagement time, a click, an eye-gaze duration, and a subsequent purchase.

4. The method of claim 2, wherein presenting the at least one electronic advertisement comprises determining at least one advertisement display time, wherein the advertisement display time is dynamically calculated based on at least one of: the location data associated with the at least one ride-share vehicle, the at least one physical advertisement location, and an advertisement data transmission rate.

5. The method of claim 1, wherein the destination comprises at least one of: an address, a GPS location, a description, an hours of operation, and a customer rating.

6. The method of claim 1, wherein the user profile data comprises at least one of: social media profile data, at least one user preference, text message data, email data, contacts data, GPS location data, and historical advertisement interaction data.

7. The method of claim 1, wherein the at least one machine learning algorithm is configured to extract features from at least one of: the destination, the desired time of arrival, and the user profile data.

8. A system comprising:
    at least one processor; and
    memory coupled to the at least one processor, the memory comprising computer executable instructions that, when executed by the at least one processor, performs a method comprising:
    receiving input data, wherein the input data is associated with at least one destination and one user;
    classifying the input data using at least one machine-learning algorithm;
    based on the classified input data and at least one database of physical advertisements geographically located in proximity to the at least one destination, generating a first advertisement-based route and an estimated time of arrival associated with the first advertisement-based route;
    receiving location data associated with at least one ride-share vehicle transporting the user and synchronized business data associated with at least one physical advertisement location along the first advertisement-based route;

receive real-time business information associated with at least one business in proximity to the at least one physical advertisement location;

based on the received real-time business information, generate a second advertisement-based route;

provide the second advertisement-based route to the at least one processor; and dynamically re-route the at least one ride-share vehicle to the second advertisement-based route.

9. The system of claim 8, wherein the input data comprises at least one of: an image, a video, a social media post, a destination address, a destination description, destination geocoordinates, a user preference, a user profile, and a desired time of arrival.

10. The system of claim 8, wherein the real-time business information comprises at least one of: hours of operation, an open-or-closed status indication, a surrounding activity indicator, a quality of external signage ranking, a capacity indicator, a current busyness indicator, an hourly busyness indicator, and a day-of-week busyness indicator.

11. The system of claim 8, wherein the first advertisement-based route is one of: a direct route, a minor detour, an average detour, a major detour, and a free route.

12. The system of claim 8, further comprising receiving, on a user device, at least one electronic advertisement associated with the at least one physical advertisement location, wherein the user device is in proximity to the at least one physical advertisement location.

13. The system of claim 12, wherein the user device comprises at least one of: a mobile phone, a tablet, a laptop, and a vehicular device.

14. The system of claim 12, wherein the at least one electronic advertisement comprises at least one of: a mobile advertisement, a static image advertisement, a video advertisement, an audio advertisement, an augmented-reality advertisement, and an in-vehicle vending machine advertisement.

15. A vehicular computer comprising:

a memory;

a processor coupled to the memory, wherein the processor is configured to:

receive input data, wherein the input data comprises a destination, a desired time of arrival, and user profile data associated with a user;

process input data according to at least one machine-learning algorithm;

determine at least one set of candidate physical advertisement locations associated with the processed input data and based on historical advertisement interaction data;

based on the processed data and the at least one set of candidate physical advertisement locations, generate a first advertisement-based route and an estimated time of arrival associated with the first advertisement-based route, wherein the first advertisement-based route comprises the greatest number of physical advertisements from the at least one set of candidate physical advertisement locations along the first advertisement-based route, and wherein the estimated time of arrival is the same as or before the desired time of arrival;

receive location data associated with the vehicular computer and synchronized business data associated with at least one physical advertisement location along the first advertisement-based route;

based on the location data associated with the vehicular computer and the synchronized business data associated with the at least one physical advertisement location along the first-advertisement route, generate a second advertisement-based route; and provide the second advertisement-based route to a route guidance module.

16. The vehicular computer of claim 15, wherein the route guidance module is configured to dynamically re-route an autonomous vehicle according to the second advertisement-based route.

17. The method of claim 1, further comprising:

providing the user at least one list of route options, wherein the at least one list of route options comprises at least one of: a direct route, a minor detour, an average detour, a major detour, and a free route.

18. The method of claim 1, wherein when the location data associated with the at least one ride-share vehicle indicates the at least one ride-share vehicle is in proximity to the at least one physical advertisement location.

19. The method of claim 1, wherein the synchronized business data comprises at least one of: a registration indication, a de-registration indication, hours of operation, an open-or-closed status indication, a surrounding activity indicator, a quality of external signage ranking, a capacity indicator, a current busyness indicator, an hourly busyness indicator, and a day-of-week busyness indicator.

20. The method of claim 1, wherein the synchronized business data associated with the at least one physical advertisement location indicates the at least one physical advertisement location has been de-registered.

* * * * *